The mechanism as shown is mounted on a
UNITED STATES PATENT OFFICE.

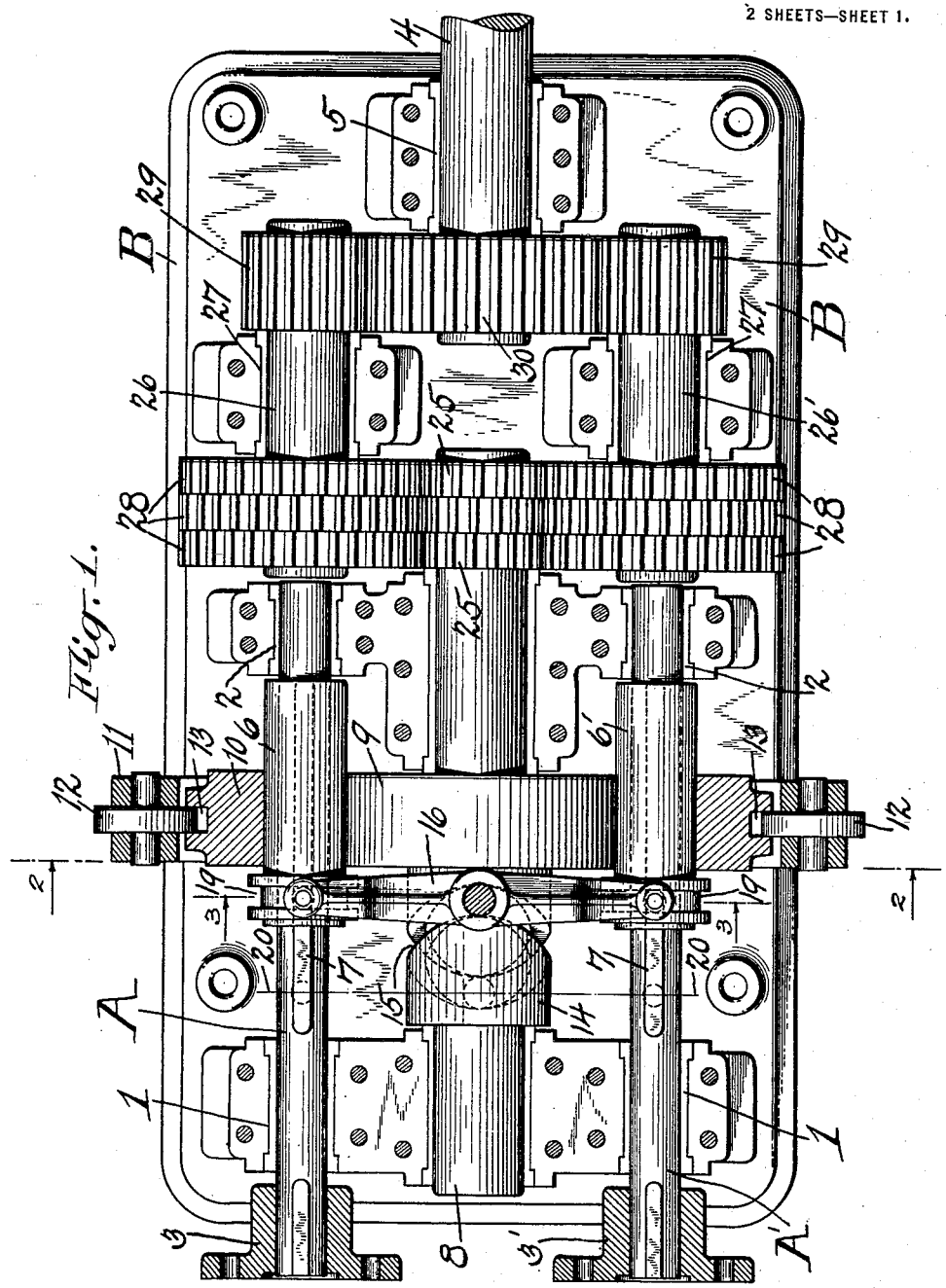

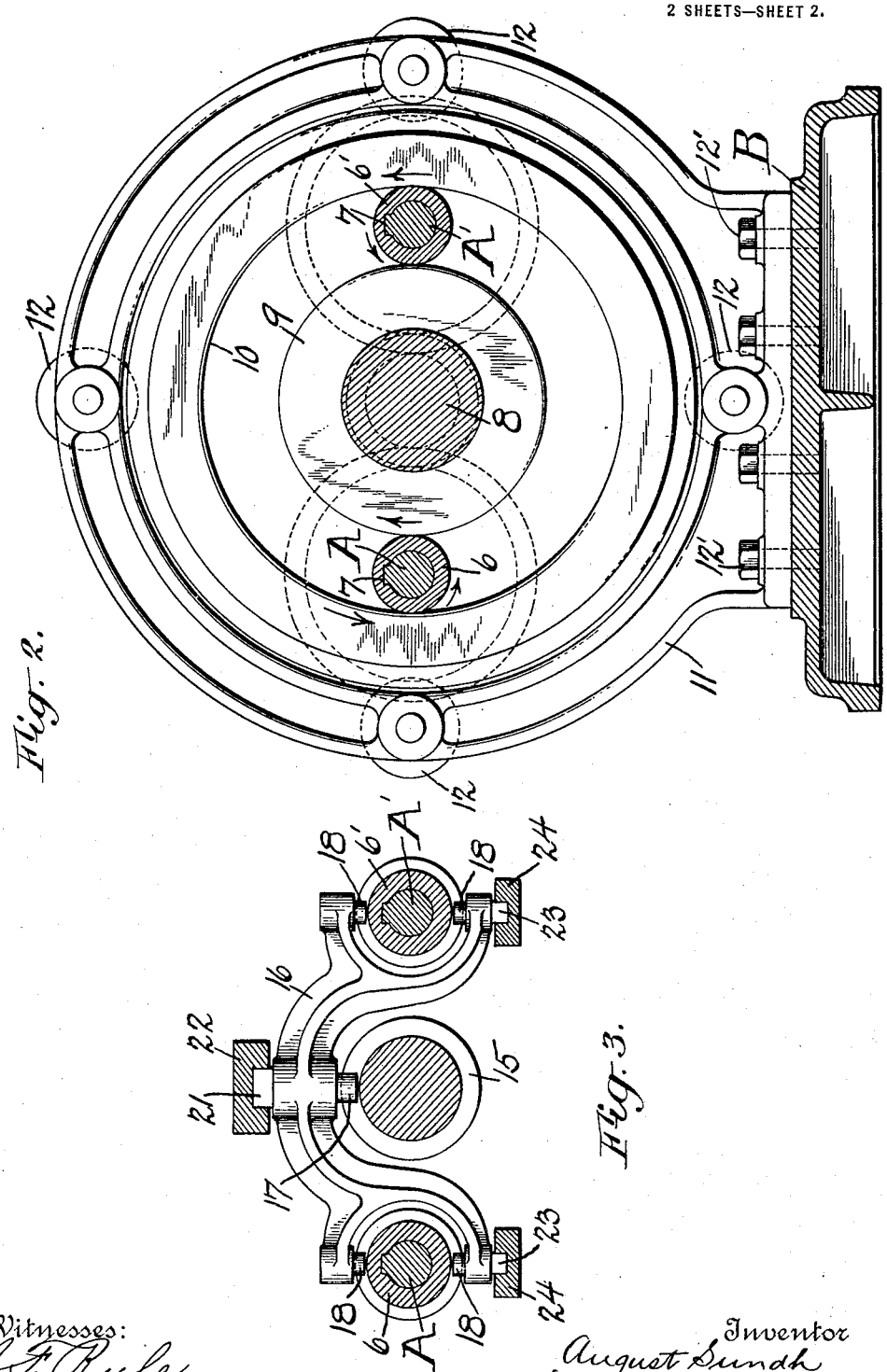

AUGUST SUNDH, OF HASTINGS-UPON-HUDSON, NEW YORK, ASSIGNOR TO OTIS ELEVATOR COMPANY, OF JERSEY CITY, NEW JERSEY, A CORPORATION OF NEW JERSEY.

SPEED-REDUCING GEARING.

1,159,608.  Specification of Letters Patent.  Patented Nov. 9, 1915.

Application filed April 29, 1911. Serial No. 624,041.

*To all whom it may concern:*

Be it known that I, AUGUST SUNDH, a citizen of the United States, residing at Hastings-upon-Hudson, in the county of Westchester and State of New York, have invented a new and useful Improvement in Speed-Reducing Gearing, of which the following is a specification.

My invention relates to speed reduction gearing, and comprises power transmitting gearing specially adapted for reduction from a high to a low speed.

The invention comprises friction gearing for reducing from a high to an intermediate speed and a spur gearing for reducing from an intermediate speed to a comparatively slow speed.

The use of spur gearing for power transmission at high speeds is impractical, largely on account of the excessive noise produced, and is therefore not suited for reducing from a high to a low speed. Frictional driving apparatus is also not well adapted for operation at slow speed on account of the excessive pressure required to prevent slipping where considerable power is transmitted, and also on account of the rapid wear of the friction rollers.

An object of the present invention is to overcome the above-noted objections and produce a form of gearing adapted to receive power from a driving member operated at a high speed, and transmit the same to a driven member operated at a low speed.

Other objects of the invention and the exact nature thereof will appear hereinafter.

Referring to the accompanying drawings which illustrate mechanism embodying a form of my invention, Figure 1 is a part sectional plan view of the mechanism; Figs. 2 and 3 are sectional elevation views as indicated by the section lines 2—2 and 3—3, respectively, of Fig. 1.

The mechanism as shown is mounted on a base plate B. Two parallel drive shafts A and A' are journaled in bearings 1 and 2, which may be carried by standards mounted on the base B. The drive shafts may be connected by means of couplings 3, 3' to any suitable source of power, as for example, electric motors, steam turbines, internal combustion engines, water motors, etc., the particular kind of prime mover or source of power employed depending upon the use to which the speed reduction gearing is put and the kind of power available or desirable. The power is transmitted through the reduction gearing to a driven shaft 4, journaled in the bearing 5.

Mounted on the drive shafts A and A' are friction rollers 6 and 6' adapted to slide freely longitudinally of the drive shafts, but held against rotation independently of the shafts by means of keys or splines 7, secured to or formed integral with the shafts. Between the drive shafts is journaled a shaft 8 to which is secured a friction disk or wheel 9 in rolling contact with the friction rollers 6 and 6'. Surrounding the latter is a ring 10 supported by and in frictional contact with the rollers 6 and 6'. An annular bracket 11 is secured to the base B by bolts 12' and surrounds the ring 10. This bracket 11 carries a series of anti-friction disks 12 which run in an annular groove 13 formed in the periphery of the ring 10. The disks 12 guide the ring 10 and hold it against movement in the direction of its axis of rotation, but permit its adjustment in a direction perpendicular to its axis to accommodate it to the friction rollers 6 and 6' as the guide rollers 12 do not extend to the bottom of the recess 13. The shaft 8 is provided with an enlarged portion 14 in which is formed a cam groove 15 surrounding the shaft. A yoke 16 is provided with a central stud or anti-friction roller 17 which extends into the cam groove 15. The ends of the yoke 16 are bifurcated to straddle the rollers 6 and 6' and are provided with studs or rollers 18 which extend into annular grooves 19 formed in the rollers 6, 6'. As the shaft 8 is rotated the yoke 16 is caused to reciprocate by means of its connection with the cam groove 15. It is reciprocated from the position shown in Fig. 1 to the position indicated by the broken line 20. The yoke is preferably provided with an upper stud 21 slidable in a stationary grooved guide 22, and lower studs 23 movable in guides 24.

The shaft 8 has secured thereto a series of toothed gears 25, arranged with their teeth in staggered relation. Shafts 26 and 26' journaled in bearings 27 are provided with spur gears 28 meshing with the gears 25. The shafts 26 and 26' also each has secured thereto a spur gear 29 which meshes with a gear 30 keyed to the driven shaft 4.

In operation either one or both of the drive shafts A and A' may be connected to and operated by a suitable prime mover or prime movers. The mechanism has been found to operate satisfactorily with an engine or motor connected to each shaft; but ordinarily and preferably power is supplied only through one of the drive shafts. If, for example, the shaft A is connected to a high speed motor, the roller 6 will be rotated at a corresponding speed and drive the wheel 9 and the shaft 8. The wheel 9 transmits motion also to the roller 6'. The rollers 6 and 6' cause the ring 10, which is in frictional contact with the rollers, also to rotate, the weight of the ring 10 tending to carry it downward produces a lateral pressure on the rollers 6 and 6', thereby pressing them against the wheel 9 and causing a good frictional driving contact between the wheel and rollers. Assuming that the roller 6 is rotating in a counterclockwise direction as indicated by the arrow, Fig. 2, it will be seen that the driving power transmitted from the roller 6 to the ring 10 will exert a downward pull on the latter, thereby increasing the pressure between the friction rollers and wheel 9. This insures a good frictional contact of the driving surfaces and reduces the lost motion or slipping to a minimum.

While the shafts A and A' are rotating at exactly the same speed, that is without any slippage between the rollers 6, 6' and the wheel 9, the downward pull exerted by the roller 6 on the ring 10 will be counterbalanced by the upward driving power transmitted from the roller 6' to the ring. If, however, any slippage should occur, between the ring and one of the rollers such as the roller 6', the downward pull of the roller 6 on the ring 10 will be greater than the upward driving power exerted by the roller 6'. The driving power exerted by the roller 6 on the ring therefore tends to swing the ring about the point of contact with the roller 6' as a fulcrum and increases the pressure of the ring on the rollers. If slipping occurs between the ring 10 and roller 6, or between the roller 6' and the wheel 9, the ring 10 will tend bodily to be raised upwardly and thereby effect a wedging action between the rollers, ring and wheel just as in the case where the ring 10 is moved downwardly, since it is obvious that a vertical displacement of the ring 10 in either direction with respect to the axis of the wheel 8 tends to increase the pressure between all of the rotary elements 6, 6', 9 and 10. In this way the pressure on the friction driving surfaces is automatically regulated to prevent any material slipping.

The wheel 9 being of larger diameter than the rollers 6 and 6', the shaft 8 is driven at a reduced speed. The gears 25 and 28 are therefore operated at an intermediate speed. These gears are staggered in order to cause a more uniform driving torque to be transmitted, and also to reduce the noise of the gears. Ordinary pinions 29 and gear 30 transmit the power to the driven shaft 4 which is operated at a comparatively slow speed. It will thus be seen that the speed is reduced in steps. At high speed the power is transmitted through friction gears; at an intermediate speed spur gears arranged in staggered relation and forming a positive drive are employed; and at low speed the power is transmitted through simple spur gears. The yoke 16 operates to reciprocate the rollers 6 and 6' as the latter are rotated. I have found by experience that when the rollers are thus reciprocated they form a much better driving connection and wear much longer than if fixed to the shafts to drive in the usual way. The reciprocation tends constantly to remove any irregularities and produce an even driving surface.

The speed reduction mechanism herein disclosed is specially adapted for operating heavy machinery as for example furnace hoists, or mine hoists. It is also well adapted for use with freight and passenger elevators and many other appliances, as for example, for speed reduction between steam turbines and the propeller shafts on steamboats, etc.

In a patent for hoisting apparatus, No. 772,005, issued jointly to myself and David L. Lindquist, dated October 11, 1904, is disclosed a floating annular ring surrounding intermediate rollers and a driving roller, pressure on said ring being obtained by the weight of an elevator car and counterweight which holds said ring in frictional contact with said intermediate rollers and through the rollers transmitting pressure to a driving roller. In a patent to David Larson for friction drive apparatus, No. 921,646, May 11, 1909, is shown an annular floating ring operated by one or two driving rollers. Therefore I do not claim broadly the use of a floating ring as a means for obtaining pressure for frictional driving elements. It will be seen that the idea involved in the present invention is substantially different from what is disclosed in said patents. In the present case I do not obtain frictional contact by lifting the annular ring and thereby obtaining pressure on the rollers. I discovered through experimenting and actual building of the invention disclosed in the patent to Sundh and Lindquist, No. 772,005, above referred to, that a driving force was transmitted from the center roller to the outside surrounding annular ring owing to the wedging action obtained when the rollers are driven. In other words the tendency of the rollers to wedge themselves is proportional to the weight of the ring or of a load on the ring, the same as when a load is lifting the annular ring, as may be seen if the ring is driven by the rollers without the car and counterweight. The mechanism shown in said patent was being thus operated at the time I conceived the present invention. In the present invention I have shown the center roller connected to a driven element because the outside annular ring changes position to some extent depending on the load when the center roller is permanently placed in its bearings; and therefore the arrangement herein shown is considered the best. It is possible, however, to connect the annular ring to the driven element through spur gearing or belting, and I wish not to limit myself to the specific form of construction shown. The present invention covers all such modifications as come within the scope and language of the appended claims.

What I claim as new and desire to secure by Letters Patent is:

1. In combination, a driving element and a driven element, power transmitting gearing between said elements comprising friction gears, and a self adjustable annular member surrounding and in rolling contact with said friction gears and adapted to hold them in driving engagement with a pressure controlled by variations in speed between the driving member and said annular member.

2. In transmission gearing, the combination of a positive driving element and self-adjusting frictional means, the said frictional means consisting of a driving roller, a roller driven thereby, a loose annular ring surrounding said rollers, and an additional roller between the ring and said driven roller, said annular ring being arranged to hold the rollers together in frictional contact by force transmitted from the said driving roller.

3. In transmission gearing, a plurality of friction rollers, a ring surrounding said rollers and holding them in frictional contact with each other by two positive forces, namely gravity produced by the weight of the ring itself, and a driving force transmitted from said friction rollers exerted against the surface of said ring.

4. The combination of a rotary driving member, a rotary driven member, friction rollers carried by said members and transmitting power from the driving member to the driven member, an additional roller, and a ring surrounding said rollers and operating by its weight and by pressure transmitted from a friction roller to exert a variable pressure in an approximately horizontal direction to hold the rollers in frictional contact.

5. The combination of a drive shaft, a friction roller carried thereby, a rotary friction member in contact with said roller, a driven shaft, means for transmitting power from the said member to the driven shaft, an additional friction member, and a ring surrounding said friction roller and said members and exerting a lateral pressure thereon and thus increasing the frictional contact between the roller and disk by the action of its own weight and by pressure transmitted by said friction roller.

6. The combination of a friction wheel, friction rollers in contact therewith, said wheel and rollers having their axes in substantially the same horizontal plane, a ring surrounding said parts and operable by gravity and by pressure transmitted from a friction roller to materially increase the frictional pressure therebetween, means for transmitting power to said rollers; and means for transmitting power from the said wheel.

7. In combination, a friction wheel friction rollers in contact therewith, an annular member supported by and running idly on said rollers and operable by gravity and by pressure transmitted from a friction roller to exert a lateral pressure on the rollers and thereby maintain the rollers and wheel in frictional contact, and means for transmitting power to the said rollers.

8. In combination, a friction wheel, friction rollers in contact therewith, an annular member supported by and running idly on said rollers and operable by gravity and by pressure transmitted from a friction roller to exert a lateral pressure on the rollers and thereby maintain the rollers and wheel in frictional contact, and means for transmitting power to the said rollers.

9. In combination, a friction wheel, friction rollers on opposite sides of the wheel and in contact therewith, and a ring surrounding the rollers and running idly thereon, said ring being in contact with the rollers and at approximately diametrically opposite points on the ring and operable by gravity and by pressure from a friction roller to wedge the friction rollers against the wheel and maintain said parts in frictional contact.

10. The combination with a friction wheel, of friction rollers in contact therewith, a ring surrounding and supported by said rollers, said ring being formed with an annular groove in its periphery, and anti-friction rollers extending into said groove.

11. The combination with rotary members in frictional contact, of a ring surrounding and supported by said members, a base, a bracket supported by the base, and anti-friction rollers carried by the bracket and forming means to prevent displacement of the ring.

12. The combination of a friction wheel, friction rollers engaging the periphery of the disk, a ring surrounding the rollers and supported thereby, said ring being formed with an annular groove or recess in its periphery, a base, an annular bracket secured to the base and surrounding said ring, and anti-friction rollers journaled in said bracket and extending into said annular groove.

13. The combination of rollers having their peripheries in rolling contact, and means for automatically imparting a reciprocating movement to one of the rollers during each complete rotation of the other roller.

14. The combination of a driving member, a parallel friction roller carried thereby, a parallel friction roller in engagement with and rotated by said first-named roller, and means for automatically imparting a relative reciprocating movement to the rollers in the direction of their axis.

15. The combination of a shaft, a roller carried thereby, and movable longitudinally of the shaft, a friction wheel in contact with said roller, said wheel and roller having their axes parallel and means for automatically imparting a reciprocating movement to the roller as it is rotated.

16. The combination of rotary members in frictional contact, and having parallel axes of rotation, a cam associated with one of said members, and means operated by said cam to reciprocate the other member as it is rotated.

17. The combination of a shaft, a roller mounted on the shaft and movable longitudinally thereof, a second shaft, a wheel carried thereby in frictional rolling contact with said roller, a cam surrounding said second shaft and means operated by said cam for imparting a reciprocating motion to the said roller as it is rotated.

18. The combination of shafts, friction rollers slidably mounted on the shafts, an intermediate shaft, a friction disk carried thereby in contact with said rollers, a cam on said intermediate shaft, and a device operated by said cam and connected to said rollers to impart a reciprocating movement thereto as the rollers are rotated.

19. The combination with parallel shafts, friction rollers splined on said shafts, a disk between said rollers and in contact therewith, a shaft carrying said disk, a cam formed on said last-named shaft, an arm extending between said friction rollers and in engagement therewith, and means carried by said arm coöperating with said cam to impart a reciprocating movement to the arm and said friction rollers as the latter are rotated.

20. In friction driving apparatus, the combination of a driving roller, driven rollers and an annular ring surrounding said rollers in rolling contact with the periphery of the driving roller and adapted to automatically create a pressure on said rollers and thereby obtain a frictional driving pressure between the latter when they are driven, whereby the motion is transmitted from one roller to another.

In testimony whereof, I have signed my name to this specification in the presence of two subscribing witnesses.

AUGUST SUNDH.

Witnesses:
J. F. RULE,
JAMES G. BETHELL.

Copies of this trade-mark may be obtained for five cents each, by addressing the "Commissioner of Patents, Washington, D. C."